(12) United States Patent
Mamtimin et al.

(10) Patent No.: US 12,099,163 B1
(45) Date of Patent: Sep. 24, 2024

(54) INTRINSIC CARBON OXYGEN FOR FORMATION SATURATION AND BOREHOLE HOLDUP

(71) Applicant: Halliburton Energy Services, Inc., Houston, TX (US)

(72) Inventors: Mayir Mamtimin, Houston, TX (US); Jeffrey James Crawford, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/223,954

(22) Filed: Jul. 19, 2023

Related U.S. Application Data

(60) Provisional application No. 63/462,403, filed on Apr. 27, 2023.

(51) Int. Cl.
*G01V 5/10* (2006.01)
*E21B 49/00* (2006.01)

(52) U.S. Cl.
CPC .............. *G01V 5/102* (2013.01); *E21B 49/00* (2013.01)

(58) Field of Classification Search
CPC ................................ G01V 5/102; E21B 49/00
See application file for complete search history.

(56) References Cited

U.S. PATENT DOCUMENTS

| | | | |
|---|---|---|---|
| 5,105,080 A * | 4/1992 | Stoller | G01V 5/104 250/266 |
| 2007/0241275 A1 | 10/2007 | Guo et al. | |
| 2009/0224146 A1 | 9/2009 | Gilchrist et al. | |
| 2020/0191993 A1 * | 6/2020 | Ma | G01V 5/145 |
| 2024/0077636 A1 * | 3/2024 | Eltaher | G01V 5/102 |

FOREIGN PATENT DOCUMENTS

WO 2017015340 A1 1/2017

OTHER PUBLICATIONS

Eyvazzadeh, Ramsin Y.; Kelder, Oscar; Hajari, A.A.; Ma, Shouxiang; Behair, Abdallah M. (). [Society of Petroleum Engineers SPE Annual Technical Conference and Exhibition—Houston, Texas (Sep. 26, 2004)] SPE Annual Technical Conference and Exhibition— Modern Carbon/Oxygen Logging Methodologies: Comparing Hydrocarbon Saturation Determination Techniques.

Shouxiang, Mark M. et al. Intrinsic Carbon-Oxygen Logging for Enhanced Consistency of Reservoir Saturation Monitoring. Society of Petrophysicists and Well Log Analysts, SPWLA 62nd Annual Logging Symposium, 2021. SPWLA-2021-0021. PDF file. 9 pages.

\* cited by examiner

*Primary Examiner* — Crystal J Lee
(74) *Attorney, Agent, or Firm* — John Wustenberg; C. Tumey Law Group PLLC

(57) ABSTRACT

The techniques as described herein result in a single set of intrinsic carbon-oxygen (CO) measurements that can be used for various borehole and formation saturation conditions, enhancing the reliability and robustness of formation evaluation in oil and gas wells. A method comprises formulating an intrinsic CO ratio for a subterranean formation, based on theoretical atomic concentrations of carbon and oxygen, and porosity and fluid saturation parameters.

14 Claims, 12 Drawing Sheets

INTRINSIC CARBON OXYGEN FOR FORMATION SATURATION AND BOREHOLE HOLDUP

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility optimization, production enhancement strategies, and reserve estimation. Petrophysical properties of a formation may be utilized as additional information that may further drive strategies for hydrocarbon production. Petrophysical properties may comprise borehole size and casing size, tool position and standoff, borehole fluid content, casing and cement quality, formation lithology, formation porosity, formation oil saturation, and/or holdup.

Generally, a pulsed neutron logging (PNL) tool is used to determine petrophysical properties of a formation. A pulsed neutron logging tool emits neutrons to interact with nuclei of any material to induce gamma radiation. The excited target nucleus relaxes to its ground state by emitting characteristic gamma radiation. Some elements emit gamma rays naturally; others can be bombarded with neutrons to induce gamma ray emissions. Each element produces characteristic gamma rays of specific energies. Further, the number of characteristic gamma rays produced is proportional to the abundance of the element. Naturally occurring and induced gamma rays may be counted and sorted according to energy. This produces a gamma ray spectrum that can be processed, or decoded, to identify the elements and their concentrations.

A pulsed-neutron logging tool may operate and function by utilizing nuclear detectors to measure induced gamma radiation by interaction of high energy neutrons that are emitted from a generator. The high energy neutrons interact with the formation in three ways: elastic neutron-scattering, inelastic neutron scattering, and neutron absorption. In elastic neutron-scattering, the neutron bounces off the bombarded nucleus without exciting it or destabilizing it. With each elastic interaction, the neutron loses energy. Hydrogen, with the mass of its nucleus equal to that of a neutron, is very good at slowing down neutrons. Hence, how efficiently a formation slows down neutrons generally indicates the abundance of hydrogen. Because hydrogen is most abundant in pore fluids, neutron slowdown indicates porosity. In inelastic neutron scattering, the neutron bounces off the nucleus, but excites it into quickly giving off what are called inelastic gamma rays. The measurement of gamma ray energies from inelastic neutron scattering yields the relative concentrations of carbon and oxygen, which are then used to determine water saturation. In neutron absorption, the nucleus absorbs the neutron and becomes excited, typically emitting captured gamma rays. Neutron absorption, or neutron capture, is most common after a neutron has been slowed by elastic and inelastic interactions to thermal energies of about 0.025 eV. The measurement of capture gamma ray energies is used to estimate the abundances of elements most likely to capture a neutron-silicon, calcium, chlorine, hydrogen, sulfur, iron, titanium, and gadolinium.

Pulsed-neutron logging provides valuable data on the formation's carbon-oxygen ratio (C/O). Inelastic measurement may be used for carbon and oxygen analysis independent of water salinity. This information is crucial for reservoir characterization, hydrocarbon reserve estimation, and production optimization. However, the measurement of a C/O using pulsed-neutron logging can vary among different oil service providers and tool configurations, leading to differences in characterization and C/O values. Variances may arise due to differences in tool design, calibration standards, or interpretation algorithms, which can pose challenges for consistent and accurate formation evaluation.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates to a unified intrinsic C/O measurement technique that combines both formation and borehole information, resulting in a single set of intrinsic C/O measurements that may be used for various borehole and formation saturation conditions, thereby enhancing reliability and robustness of formation evaluation in oil and gas wells. The technique may be used for formation saturation and borehole holdup analysis and provides a dynamic C/O by combining atomic concentrations of carbon and oxygen from a borehole fluid and formation matrix, ensuring accuracy and reliability irrespective of service provider or tool differences. The technique enhances consistency, accuracy, and efficiency in formation evaluation, particularly in varying borehole holdup conditions, enabling improved reservoir characterization and optimized production strategies.

Pulsed-neutron logging is a widely used technique in oil and gas wells for evaluating formation oil saturation. It involves the use of a pulsed neutron generator to emit high-energy neutrons into the formation and measures the resulting gamma-ray emissions and neutron capture responses, providing valuable data on the formation's C/O. This information is crucial for reservoir characterization, hydrocarbon reserve estimation, and production optimization. C/O log may be preferred for fresh water and/or mixed salinity environments.

Figure 1:
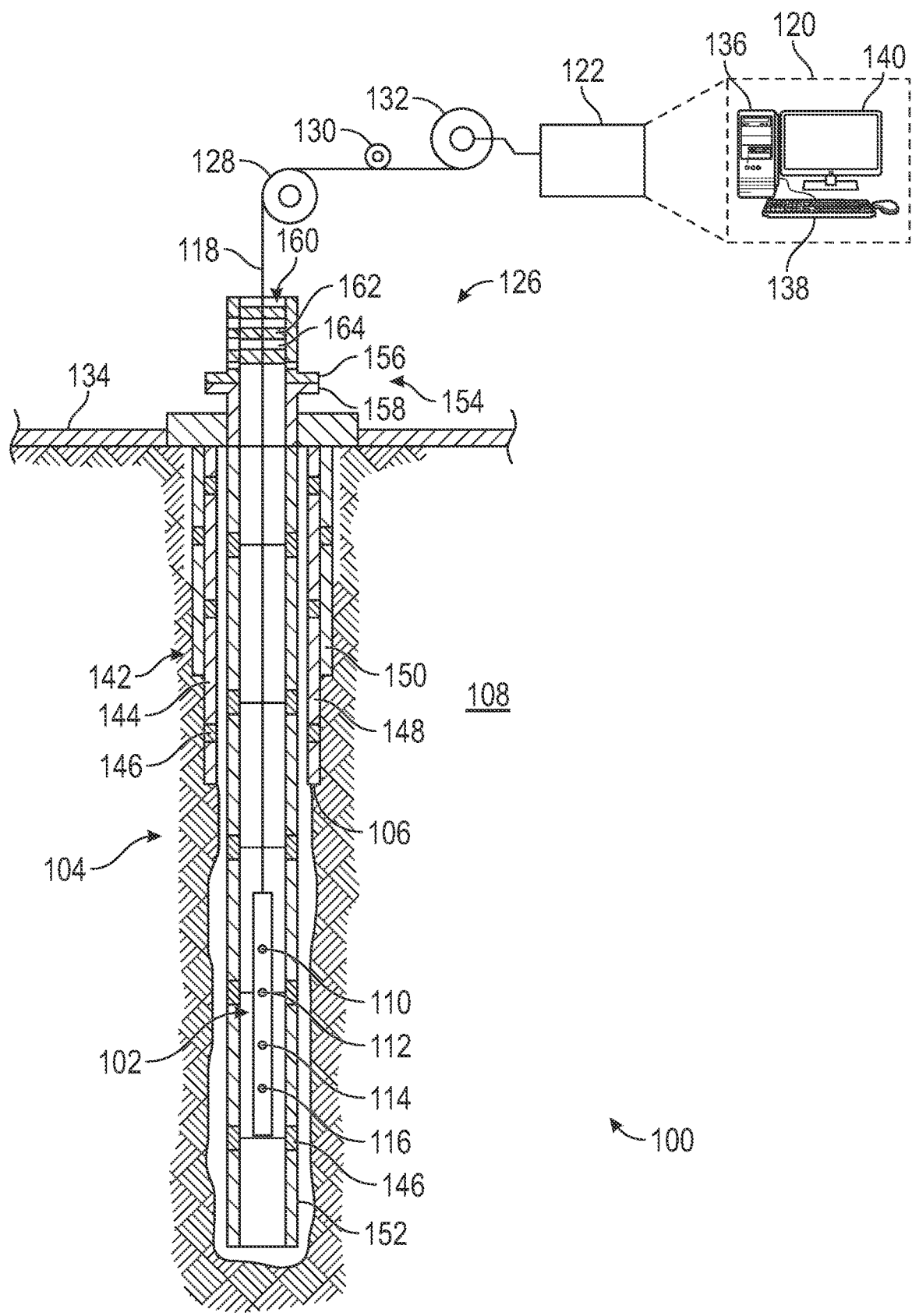
FIG. 1 illustrates a downhole tool in a wireline configuration, in accordance with examples of the present disclosure.

FIG. 1 illustrates logging/measuring operation 100, as disclosed herein, utilizing a pulsed-neutron logging (PNL) tool 102. FIG. 1 illustrates a cross-section of borehole 104 with a pulsed-neutron logging tool 102 traveling through well casing 106. Borehole 104 may traverse through subterranean formation 108 (e.g., hydrocarbon reservoir) as a vertical well and/or a horizontal well. Pulsed-neutron logging tool 102 contains a neutron source 110, a first neutron detector 112, a second neutron detector 114, and a gamma ray detector 116. Pulsed-neutron logging tool 102 is suspended by a conveyance 118, which communicates power from a logging facility 120 to pulsed-neutron logging tool 102 and communicates telemetry from pulsed-neutron logging tool 102 to computer 122. In examples, pulsed-neutron logging tool 102 may be operatively coupled to a conveyance 118 (e.g., wireline, slickline, coiled tubing, pipe, downhole tractor, and/or the like) which may provide mechanical suspension, as well as electrical connectivity, for pulsed-neutron logging tool 102. Conveyance 118 and pulsed-neutron logging tool 102 may extend within casing string 142 to a desired depth within borehole 104. Conveyance 118, which may include one or more electrical conductors, may exit wellhead 126, may pass around pulley 128, may engage odometer 130, and may be reeled onto winch 132, which may be employed to raise and lower the tool assembly in borehole 104. The position of pulsed-neutron logging tool 102 may be monitored in a number of ways, including an inertial tracker in pulsed-neutron logging tool 102 and a paid-out conveyance length monitor in logging facility 120 (e.g., an idler wheel on the wireline cable). Multiple measurements may be desirable to enable the system to compensate for varying cable tension and cable stretch due to other factors. Computer 122 in logging facility 120 collects telemetry and position measurements and provides position-dependent logs of measurements from pulsed-neutron logging tool 102 and values that may be derived therefrom.

Pulsed-neutron logging tool 102 generally includes multiple instruments for measuring a variety of downhole parameters. Wheels, bow springs, fins, pads, or other centralizing mechanisms may be employed to keep pulsed-neutron logging tool 102 near the borehole axis during measurement operations. During measurement operations, generally, measurements may be performed as pulsed-neutron logging tool 102 is drawn up hole at a constant rate. The parameters and instruments may vary depending on the needs of the measurement operation.

Pulsed-neutron logging tool 102 operates by generating pulses of high energy neutrons that radiate from neutron source 110 into the surrounding environment including borehole 104 and formation 108. The highly energetic neutrons entering the surrounding environment interact with atomic nuclei, inducing gamma radiation. The induced gamma rays may be recorded as a scattering rate (and hence the rate of energy loss) and are generally dominated by the concentration of hydrogen atoms. Induced gamma rays and neutrons may be recorded by first neutron detector 112, second neutron detector 114, and/or gamma ray detector 116. As the presence of hydrogen is primarily attributable to the presence of water or hydrocarbon fluids, the rate of energy loss and gamma spectrum may yield accurate knowledge of borehole holdup. Accurate knowledge of the borehole holdup determines the accuracy of oil saturation in the formation as well as determining the flow in horizontal production wells.

Measurements taken by pulsed-neutron logging tool 102 may be gathered and/or processed by computer 122. For example, signals recorded by pulsed-neutron logging tool 102 may be sent to computer 122 where they may be stored on memory and then processed. The processing may be performed real-time during data acquisition or after recovery of pulsed-neutron logging tool 102. Processing may alternatively occur downhole on a computer disposed on pulsed-neutron logging tool 102 or may occur both downhole and at surface. In some examples, signals recorded by pulsed-neutron logging tool 102 may be conducted to computer 122 by way of conveyance 118. Computer 122 may process the signals, and the information contained therein may be displayed for an operator to observe and stored for future processing and reference. Computer 122 may also contain an apparatus for supplying control signals and power to pulsed-neutron logging tool 102.

As noted above, systems and methods of the present disclosure may be implemented, at least in part, with computer 122. While shown at surface 134, computer 122 may also be located at another location that is remote from borehole 104. In examples, computer 122 may be disposed on pulsed-neutron logging tool 102, which may allow for processing to occur downhole. Additionally, one or more computers 122 may be utilized during measurement operations. In such examples, a first computer 122 may be at surface 134 and a second computer 122 may be disposed on pulsed-neutron logging tool 102 downhole. Computer 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, a computer 122 may be a processing unit 136, a network storage device, or any other suitable device and may vary in size, shape, performance, functionality, and price. Computer 122 may include random access memory (RAM), one or more processing resources such as a central processing unit (CPU) or hardware or software control logic, ROM, and/or other types of nonvolatile memory. Additional components of the computer 122 may include one or more disk drives, one or more network ports for communication with external devices as well as an input device 138 (e.g., keyboard, mouse, etc.) and video display 140. Computer 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a typical casing string 142 that may extend from wellhead 126 at or above ground level to a selected depth within borehole 104. Casing string 142 may comprise a plurality of joints 144 or segments of casing string 142, each joint 144 being connected to the adjacent segments by a collar 146. There may be any number of layers in casing string 142. For example, a first casing 148 and a second casing 150. It should be noted that there may be any number of casing layers. FIG. 1 also illustrates a typical pipe string 152, which may be positioned inside of casing string 142 extending part of the distance down borehole 104. Pipe string 152 may be production tubing, tubing string, casing string, or other pipe disposed within casing string 142. Pipe string 152 may comprise concentric pipes. It should be noted that concentric pipes may be connected by collars 146. Pulsed-neutron logging tool 102 may be dimensioned so that it may be lowered into borehole 104 through pipe string 152, thus avoiding the difficulty and expense associated with pulling pipe string 152 out of borehole 104. In examples, cement (not illustrated) may be disposed on the outside of pipe string 152. Cement may further be disposed between pipe string 152 and casing string 142. It should be noted that cement may be disposed between any number of casings, for example between first casing 148 and second casing 150.

In logging systems, such as, for example, logging systems utilizing the pulsed-neutron logging tool 102, a digital telemetry system may be employed, wherein an electrical circuit may be used to both supply power to pulsed-neutron logging tool 102 and to transfer data between computer 122 and pulsed-neutron logging tool 102. A DC voltage may be provided to pulsed-neutron logging tool 102 by a power supply located above ground level, and data may be coupled to the DC power conductor by a baseband current pulse system. Alternatively, pulsed-neutron logging tool 102 may be powered by batteries located within the downhole tool assembly, and/or the data provided by pulsed-neutron logging tool 102 may be stored within the downhole tool assembly, rather than transmitted to the surface during logging.

With continued reference to FIG. 1, wellhead 126 is described. Wellhead 126 allows for entry into borehole 104, such as the placement of pulsed-neutron logging tool 102 into pipe string 152. In examples, wellhead 126 may include a lubricator head 154 and a lubricator head flange 156 which may be coupled to and sealed with lubricator body flange 158. Lubricator head 154 comprises sealing cartridge 160. Sealing cartridge 160 may be removable from lubricator head 154. Sealing cartridge 160 may be a container comprising a plurality of sealing elements 162 and lubricator cavities 164. Sealing elements 162 may comprise, but are not limited to, elastomeric materials, thermoplastic materials, thermosetting materials, composites thereof, or combinations thereof. Sealing elements 162 comprise an inner diameter to allow for pulsed-neutron logging tool 102, conveyance 118, wireline, coiled tubing, and/or the like to be disposed into borehole 104. Sealing elements 162 form a seal around conveyance 118 (or tubing if provided). Sealing elements 162 are selected such that the length of the diameter of the inner diameter is able to sufficiently seal around conveyance 118. In some example methods, a sealing cartridge 160 comprising a plurality of sealing elements 162 of one size may be removed if desired and exchanged for a different sealing cartridge 160 comprising a plurality of sealing elements 162 of a different size if desired. For example, if a wireline operation requires sealing elements 162 of a first size, upon completion of said wireline operation, the sealing cartridge 160 comprising the sealing elements 162 of a first size may be removed from lubricator head 154 and replaced with a second sealing cartridge 160 comprising sealing elements 162 of a second size to perform a subsequent operation, for example a tripping operation.

The C/O obtained through pulsed-neutron logging plays a critical role in formation saturation analysis using both yields-based ($C/O_{yields}$) and windows-based ($C/O_{windows}$) methods. The $C/O_{yields}$ method is used to determine the carbon and oxygen yields from the measured inelastic spectrum, and their ratio is used to determine oil volume and oil saturation. The $C/O_{yields}$ method provides good accuracy but reduced precision. Advantages of this method are ease of use and interpretation. However, the contribution of carbon to the total spectrum is relatively small. Therefore, good statistics require long measurement times, thus slow logging speeds. To shorten measurement times without sacrificing precision, a windows-based method has been adopted. In window-based methods, the $C/O_{windows}$ is derived from the ratio of count-rates of carbon and oxygen inelastic scattering gammas. Windows are sections of the spectrum most influenced by changes in carbon and oxygen and least influenced by changes in other elements. The ratio of the gamma ray counts from the "carbon window" to counts in the "oxygen window" is then used to determine a more precise saturation. The $C/O_{windows}$ method provides good precision but poor accuracy. It improves the statistics of the measurements because the total counts in the windows are high. However, interpretation is more difficult.

For example, in a clean, water-bearing sand and a water-filled borehole, the $C/O_{yields}$ ratio would be zero, whereas the $C/O_{windows}$ ratio is non-zero. The ratio produced by the windows method must be calibrated with ratios measured under known conditions. Ideally, the tool using the $C/O_{windows}$ would be logged first in a known water-bearing zone to determine a zero carbon value, then logged in a zone of known oil saturation to obtain a second calibration point.

Accurate determination of oil saturation is essential for estimating hydrocarbon reserves and optimizing production strategies, making the C/O a crucial parameter in pulsed-neutron logging for robust and reliable formation evaluation using both window-based and yield-based methods. For instance, C/O obtained through pulsed-neutron logging technique is less affected by formation water salinity. However, the CO ratio obtained through pulsed-neutron logging technique may be affected by formation gas due to the lower atomic density of carbon in gas layer compared with oil layer as the inelastic gamma rays of carbon usually have a poor statistic which is adverse to the evaluation of gas saturation. However, the measurement of C/O using pulsed-neutron logging can vary among different service providers and tool configurations, leading to differences in characterization and C/O values. Variances may arise due to differences in tool design, calibration standards, or interpretation algorithms, which can pose challenges in consistent and accurate formation evaluation. The intrinsic C/O measurement technique as described herein accounts for these differences and provides reliable C/O values that are independent of service providers or tool variances.

Like many other measurements such as bulk density, for a given reservoir, the ratio between carbon and oxygen atomic number densities (C/O) should only be a function of the formation properties (lithology, porosity, and fluid type and saturation). This intrinsic C/O, or (C/O)i, if obtainable, can then be used directly for reservoir performance diagnoses, like the use of the sigma log, where the apparent formation sigma values are corrected for diffusion and environmental effects and reported as the intrinsic sigma. In addition, raw measurements of intrinsic C/O from different tools should be comparable, an important requirement for time-lapse dynamic petrophysics. Unfortunately, all current pulsed-neutron logging tools provide only apparent, not intrinsic, C/O measurement, making log quality control and the use of C/O raw data for benchmarking difficult.

To overcome the discrepancies in C/O measurement from different service providers and tool configurations, the intrinsic C/O in the formation may be formulated based on theoretical atomic concentrations of carbon and oxygen in the unified system of the formation and the borehole. The intrinsic C/O calculation is based on the concept of theoretical atomic concentrations of carbon and oxygen in the formation. Porosity and fluid saturation parameters, such as water saturation ($S_w$) and hydrocarbon saturation ($S_o$), are used in conjunction with the elemental concentrations of carbon and oxygen in the formation matrix to derive the intrinsic C/O. The theoretical atomic concentrations of C and O in the formation and borehole can be estimated using Equation (1).

$$(C/O)_i = (C_{fi} + C_{bh})/(O_{fi} + O_{bh}) \quad \text{Equation (1)}$$

where $(C/O)_i$ is the intrinsic CO ratio; $C_{fi}$ is the theoretical atomic concentration of carbon in the formation matrix and formation fluid; $C_{bh}$ is the theoretical atomic concentration of carbon in the borehole fluid; $O_{fi}$ is the theoretical atomic concentration of oxygen in the formation matrix and formation fluid; $O_{bh}$ is the theoretical atomic concentration of oxygen in the borehole fluid.

In subsurface, there are two basic types of rocks: sandstone and carbonates. Sandstone contains mainly quartz while carbonates are dominated by limestone and dolomite, depending on the degree of dolomitization. The subsurface rocks are saturated with either water or water and hydrocarbon (oil and/or gas). Chemically, calculations of C and O in terms of weight fractions are straight forward, as demonstrated in Table 1:

TABLE 1 weight based intrinsic C/O for materials commonly encountered in subsurface formations.

| Element | Material | Molecular Weight (g/mol) | C (wt %) | O (wt %) | Weight Based intrinsic C/O |
|---------|----------|--------------------------|----------|----------|----------------------------|
| Carbon | Quartz | 60.084 | 0 | 53.30% | 0 |
| Oxygen | Calcite | 100.086 | 12.00% | 48.00% | 0.25 |
| Calcium | Dolomite | 184.398 | 13.00% | 52.10% | 0.25 |
| Magnesium | Methane | 16.042 | 74.90% | 0 | |
| Silicon | Oil | | | 0 | |
| Hydrogen | Water | 18.015 | 0 | 88.80% | 0 |

For example, calcite has a molecular weight of about 100 g/mol that includes one C atom with an atomic mass of about 12 amu, thus weight fraction of C atom in the calcite molecule is 12%. On the other hand, one calcite molecule contains three O atoms of atomic mass of about 16 amu, the weight fraction of O atoms in a calcite molecule is 48%. The C/O ratio in a calcite molecule is then 12/48=0.25.

Reservoir saturation monitoring is a volumetric measurement. Thus, it is necessary to use the atomic number density ($n^v$), which is defined as the concentration of atom numbers per unit volume, to represent carbon and oxygen in order to calculate their related ratio C/O. For atoms of a well-defined molar mass M (kg/mol), the atomic number density $n^o$ for a specific atom can be expressed in terms of the Avogadro constant $A_c$ (6.0221×10$^{23}$ mol$^{-1}$) and their mass density $\rho_m$ (kg/m$^3$) as shown in Equation (2)

$$n^v = A_c(1/M)\rho_m \quad \text{Equation (2)}$$

where $n^v$ is the atomic number density in number/volume (m$^3$), $A_c$ is the Avogadro constant in mol$^{-1}$, M is the molar mass in kg/mol, and $\rho_m$ is the mass density in kg/m$^3$.

Using Equation (2), atomic number density based intrinsic C/O is calculated and summarized in Table 2. Note that for limestone and dolomite matrix, the weight-based C/O is 0.25 (Table 1) while the atomic number density-based C/O is 0.3333 (in Table 2 below).

TABLE 2 atomic number based intrinsic C/O for materials commonly encountered in subsurface formations.

| Material | M (g/mol) | ρm | $n^v$ c | $n^v$ o | (C/O)$_i$ = $n^v$ c / $n^v$ o |
|----------|-----------|-----|---------|---------|-------------------------------|
| Quartz | 60.084 | 2.65 | 0 | 5.312 × 10$^{22}$ | 0 |
| Calcite | 100.086 | 2.71 | 1.6306 × 10$^{22}$ | 4.8917 × 10$^{22}$ | 0.3333 |
| Dolomite | 184.398 | 2.85 | 1.8615 × 10$^{22}$ | 5.5845 × 10$^{22}$ | 0.3333 |
| Oil | | 0.75 | 3.227 × 10$^{22}$ | 0 | ∞ |
| Water | 18.015 | 1.00 | 0 | 3.3428 × 10$^{22}$ | 0 |

In theory, C/O is a good water and oil differentiator as water (H$_2$O) has a strong O with no C signal, while oil (such as $C_nH_{2n}$) has a strong C signal with only trace amount of O as one of the impurities. Consequently, if the below is assumed for a subsurface formation with porosity Ø and oil saturation $S_o$, then atomic number density for C ($n^v$c) and O ($n^v$o) can be expressed as $$n^v c = (1-Ø)n^v_{C,ma} + ØS_o n^v_{C,o} \quad \text{Equation (3)}$$

$$n^v o = (1-Ø)n^v_{O,ma} + ØS_o n^v_{C,o} \quad \text{Equation (4)}$$

The atomic number density based intrinsic C/O becomes:

$$(C/O)_i = (n^v_C/n^v_O) = [(1-Ø)n^v_{C,ma} + ØS_o n^v_{C,o}] / [(1-Ø)n^v_{O,ma} + ØS_o n^v_{C,}] \quad \text{Equation (5)}$$

where Ø is formation porosity, $S_o$ is oil saturation, $n^v_{O,ma}$ is O atomic number density in matrix, $n^v_{O,w}$ is O atomic number density in water, $n^v_{C,ma}$ is C atomic number density in matrix, $n^v_{C,o}$ is C atomic number density in oil.

Due to geological deposition and diagenesis, limestone is chemically purer than dolostone, while shaly sand is much more complex to evaluate than clean quartz sands. Impurities in rock matrix, thus uncertainties in $n^v_{O,ma}$ and $n^v_{C,ma}$ can be important sources of C/O log interpretation uncertainty.

More importantly, determination of $n^v_{C,0}$ may possess the largest uncertainty because the oil carbon density depends on reservoir pressure and temperature, thus $n^v_{C,0}$ may not be a constant, but a function of oil density and composition.

$$n^v_{C,0} = 5.02 \times 10^{22} (12 \rho_0/(12+R)) \quad \text{Equation (6)}$$

where $\rho_0$ is oil density and R is the hydrogen/carbon ratio for a given oil.

Figure 2:
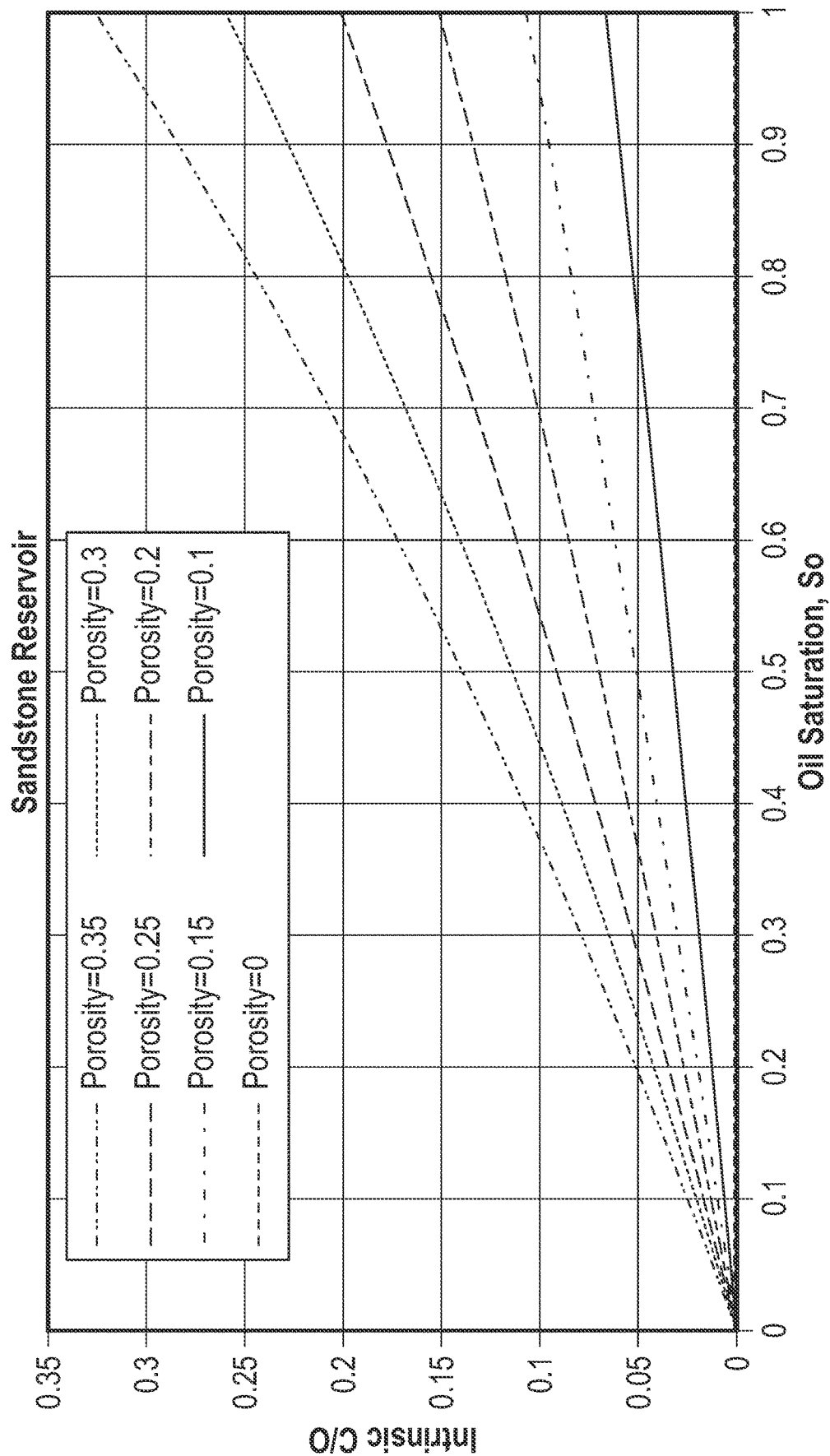
FIG. 2 illustrates the theoretical relationship between oil saturation and intrinsic C/O at different porosities in sandstone reservoir, in accordance with examples of the present disclosure.
Figure 3:
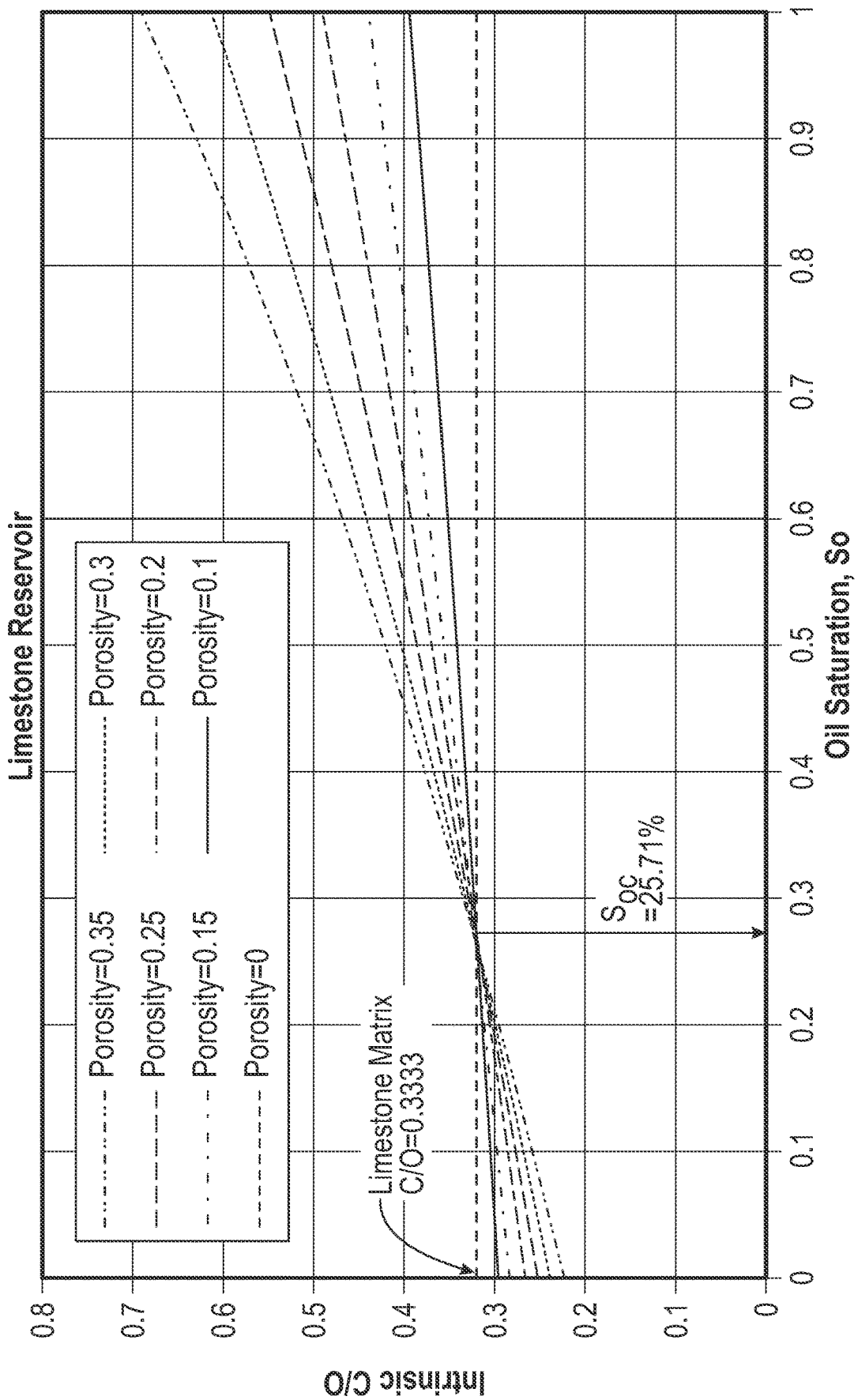
FIG. 3 illustrates the theoretical relationship between oil saturation and intrinsic C/O at different porosities in limestone reservoir, in accordance with examples of the present disclosure.

If $\rho_0 = 0.75$ g/cc and R=2, then $n^v_{C,0} = 3.227 \times 10^{22}$, as shown in Table 2 above. Using parameters listed in Table 2 and Equation (5) above, the relationships between $S_o$ and intrinsic C/O can be obtained for sandstone (FIG. 2) and limestone (FIG. 3). For clean sandstone reservoirs, rock matrix does not contain carbon, thus C/O=0 if porosity=0 (FIG. 2). As water does not contain any carbon, C/O=0 for fully fresh water saturated ($S_o$=0) rocks with any porosity, thus the water line is the horizontal axis. For partially saturated rocks, the higher the oil saturation and the higher the porosity, the higher the C/O. For clean limestone, the matrix contains both C and O with a theoretical ratio of C/O=0.3333. For fully fresh water saturated rocks, i.e., $S_o$=0, the higher the porosity, the less the matrix, thus the less the total system C/O. Adding oil to the system will increase C/O until a critical oil saturation, $S_{oc}$, at which the system reaches the matrix ratio of C/O=0.3333. This critical oil saturation is found to be $S_{oc}$=25.71% (FIG. 3). At even higher oil saturation of $S_o > S_{oc}$, the higher the oil saturation and the higher the porosity, the higher the C/O.

Figure 4:
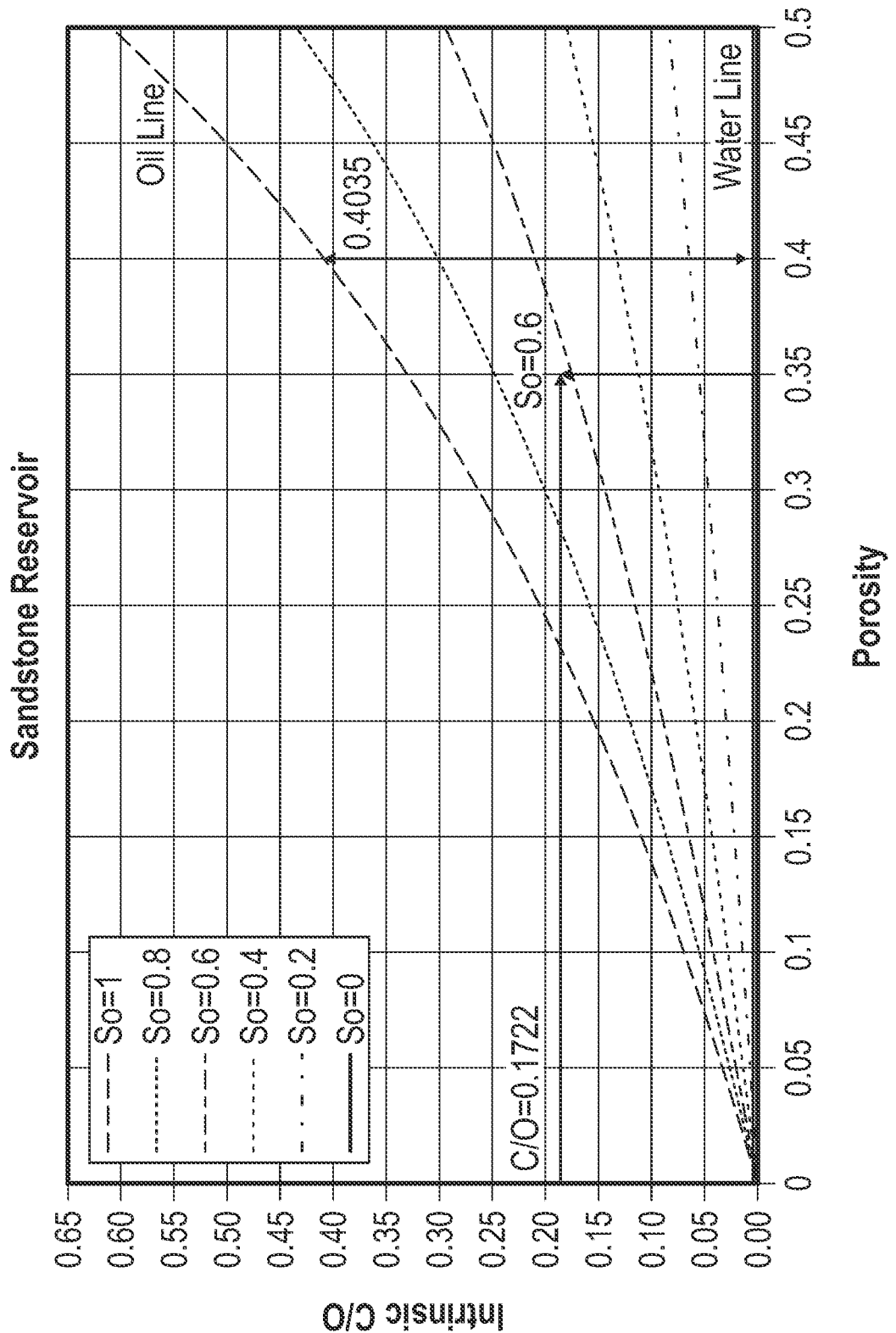
FIG. 4 illustrates the theoretical determination of oil saturation from porosity and C/O measurements in sandstone reservoir, in accordance with examples of the present disclosure.
Figure 5:
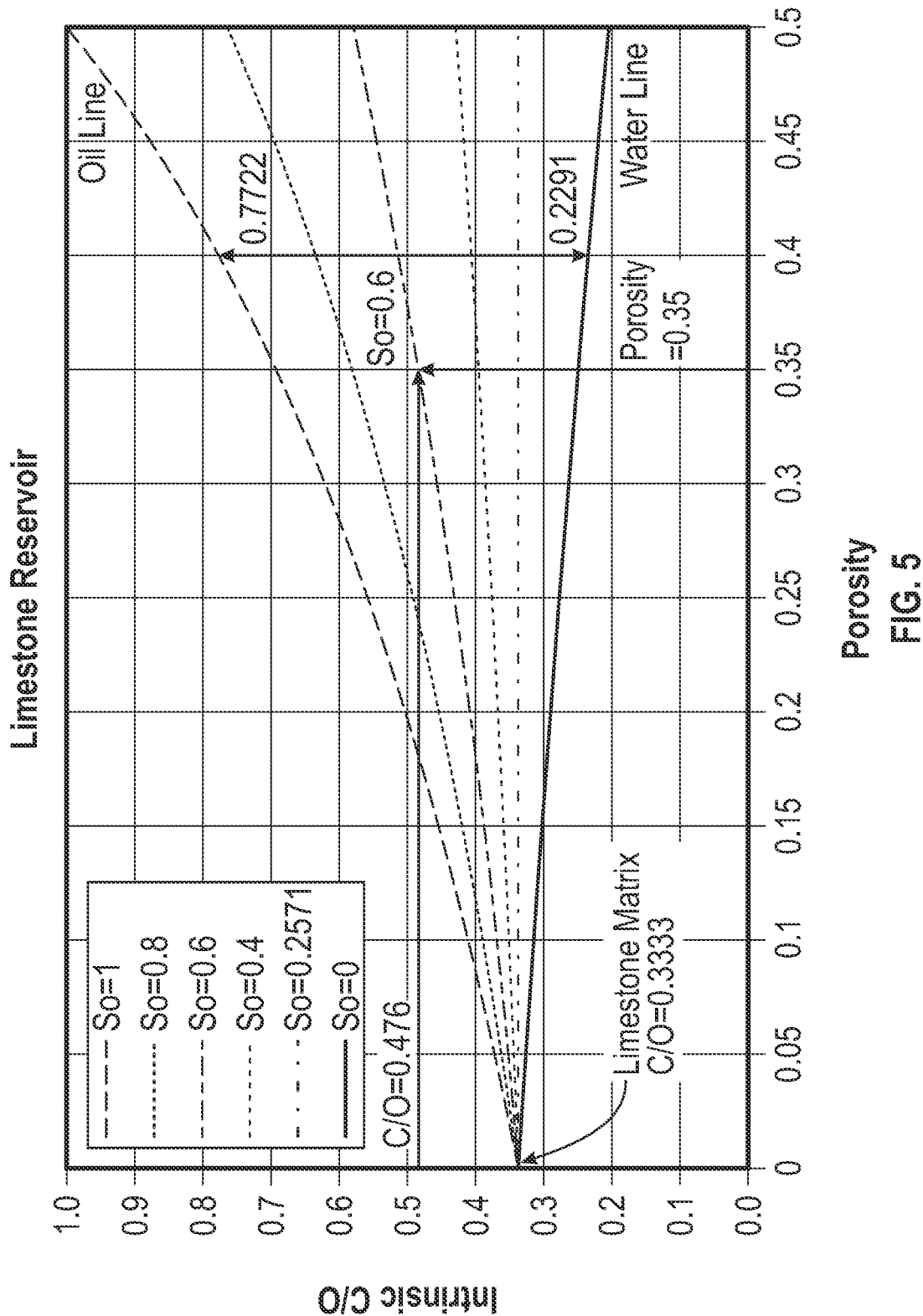
FIG. 5 illustrates the theoretical determination of oil saturation from porosity and C/O measurements in limestone reservoir, in accordance with examples of the present disclosure.

FIG. 2 and FIG. 3 demonstrate the effects of oil saturation and porosity on intrinsic C/O. However, in applications, $S_o$ is not an input, but an output of C/O logging. The same data set can be rearranged to show the relationships between porosity and C/O at different saturations, for sandstone (FIG. 4) and limestone (FIG. 5) reservoirs, the so-called fan charts. In applications, reservoir porosity, usually considered as a constant with respect to field development, can be obtained from other analysis such as original open hole logs. C/O log is acquired during pulsed-neutron logging, then reservoir oil saturation can be determined for sandstone and limestone reservoirs using the fan charts (FIG. 4 and FIG. 5).

Figure 6:
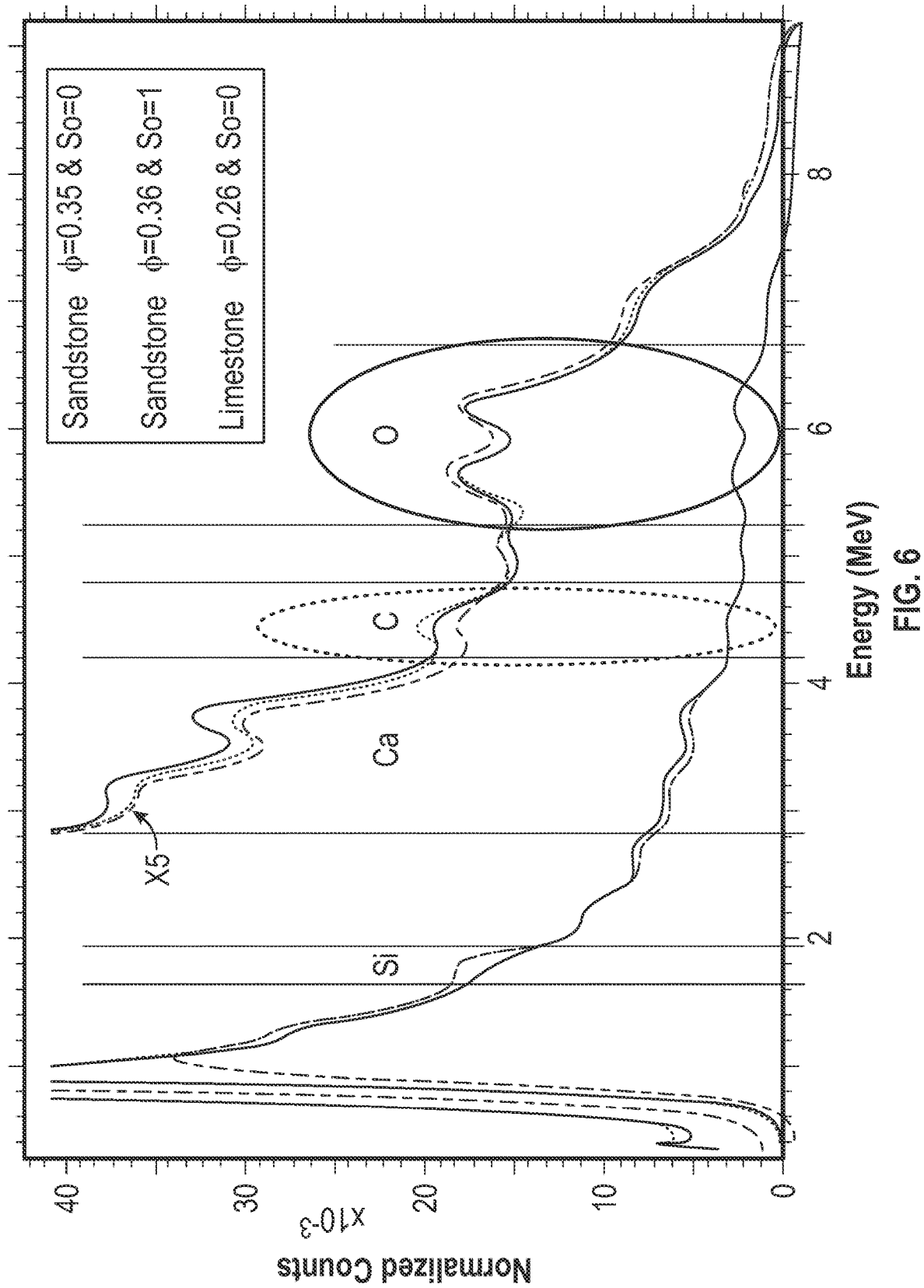
FIG. 6 illustrates a neutron inelastic gamma ray spectrometry and its applications in estimating carbon and oxygen relative abundance in porous formations.

In practice, pulsed-neutron C/O logging tools do not measure atomic number densities of C and O, $n^v_C$ and $n^v_O$, directly, but rather estimate their ratio (C/O) based on neutron inelastic spectrometry in a way shown in FIG. 6. Methods of spectral analysis include spectral elemental windows counts (the windows method), spectral elemental yield counts (the yield method), and/or the combination of the two.

As mentioned above, the main advantage of the windows method (FIG. 6) is it has better repeatability (i.e., precision), while the advantage of the yield method is that it is more accurate. A possible disadvantage of the windows method is that it may carry a systematic error while a weakness of the yield method is that its signal/noise ratio is lower, thus less precise. Trying to take advantages of the precise windows method and accurate spectral method, a method based on the combination of the two has also been developed.

For a specific tool design, tool responses to C and O concentrations can be obtained either by the relative fast and less expensive Monte-Carlo (MC) modeling or much more expensive, time consuming, difficult to conduct, but more representative physical tool measurements in a testing facility. It should be noted that for some complicated tests, Monte-Carlo modeling may be the only method that we can use to investigate. Consequently, a common practice in the industry may be to conduct extensive detailed tool responses modeling studies first, and then calibrate modeling results with a limited few key physical measurement.

The Monte-Carlo N-Particle transport (MCNP) code developed to track many particle types over broad ranges of energies is used in this study to simulate the responses of a modern C/O logging tool, named as M tool in this disclosure. The use of Monte-Carlo N-Particle to model performances of nuclear logging tools has become a standard practice in the industry. The modeled results are used to benchmark logging tool measurements in the laboratory and field and optimize the logging tool performance.

A total of 120 Monte-Carlo simulation studies were conducted, including two types of boreholes, three borehole oil holdups, two rock lithologies, three porosities, and five saturations. In Table 3, 30 Monte-Carlo simulations were performed with an ideal 2.125" borehole. In Table 4, 90 Monte-Carlo simulations were performed with a realistic 6" borehole.

TABLE 3

Monte-Carlo modeling-30 cases of ideal 2.125" borehole.

| Formation | | 30 | | | Predicted | Delta Apparent |
|---|---|---|---|---|---|---|
| Lith | φ (%) | So (%) | Intrinsic $(C/O)_i$ | Apparent $(C/O)_A$ | Apparent $(C/O)_{Ap}$ | Delta $(C/O)A$ |
| SS | 12 | 0 | 0.000 | 0.452 | 0.4504 | 0.0016 |
| SS | 12 | 25 | 0.019 | 0.467 | 0.4645 | 0.0025 |
| SS | 12 | 50 | 0.038 | 0.479 | 0.4785 | 0.0005 |
| SS | 12 | 75 | 0.059 | 0.496 | 0.4941 | 0.0019 |
| SS | 12 | 100 | 0.080 | 0.507 | 0.5096 | −0.0026 |
| SS | 25 | 0 | 0.000 | 0.443 | 0.4400 | 0.0030 |
| SS | 25 | 25 | 0.042 | 0.478 | 0.4711 | 0.0069 |
| SS | 25 | 50 | 0.088 | 0.511 | 0.5051 | 0.0059 |
| SS | 25 | 75 | 0.139 | 0.546 | 0.5429 | 0.0031 |
| SS | 25 | 100 | 0.195 | 0.580 | 0.5843 | −0.0043 |
| SS | 35 | 0 | 0.000 | 0.434 | 0.4320 | 0.0020 |
| SS | 35 | 25 | 0.063 | 0.476 | 0.4786 | −0.0026 |
| SS | 35 | 50 | 0.135 | 0.533 | 0.5319 | 0.0011 |
| SS | 35 | 75 | 0.218 | 0.586 | 0.5933 | −0.0073 |
| SS | 35 | 100 | 0.315 | 0.651 | 0.6651 | −0.0141 |
| LS | 12 | 0 | 0.305 | 0.645 | 0.6544 | −0.0094 |
| LS | 12 | 25 | 0.332 | 0.667 | 0.6744 | −0.0074 |
| LS | 12 | 50 | 0.360 | 0.689 | 0.6951 | −0.0061 |
| LS | 12 | 75 | 0.389 | 0.710 | 0.7166 | −0.0066 |
| LS | 12 | 100 | 0.420 | 0.738 | 0.7395 | −0.0015 |
| LS | 25 | 0 | 0.271 | 0.620 | 0.6248 | −0.0048 |
| LS | 25 | 25 | 0.330 | 0.667 | 0.6685 | −0.0014 |
| LS | 25 | 50 | 0.394 | 0.718 | 0.7158 | 0.0022 |
| LS | 25 | 75 | 0.466 | 0.770 | 0.7691 | 0.0009 |
| LS | 25 | 100 | 0.545 | 0.824 | 0.8276 | −0.0036 |
| LS | 35 | 0 | 0.244 | 0.584 | 0.6007 | −0.0167 |
| LS | 35 | 25 | 0.328 | 0.654 | 0.6629 | −0.0089 |
| LS | 35 | 50 | 0.426 | 0.730 | 0.7354 | −0.0054 |
| LS | 35 | 75 | 0.540 | 0.822 | 0.8198 | 0.0022 |
| LS | 35 | 100 | 0.675 | 0.916 | 0.9197 | −0.0037 |

It is noted that the ideal case is essentially no borehole, i.e., the tool outside diameter, or OD, is the same 2.125" as the borehole inside diameter, ID, thus the tool has a direct contact with the simulated formation in all directions.

TABLE 4

Monte-Carlo modeling-90 cases of realistic 6" borehole

| Yo (%) | Lith | Formation φ (%) | So (%) | Yo (%) | Lith | 30 φ (%) | So (%) | Yo (%) | Lith | 30 φ (%) | So (%) |
|---|---|---|---|---|---|---|---|---|---|---|---|
| 0 | SS | 12 | 0 | 50 | SS | 12 | 0 | 100 | SS | 12 | 0 |
| 0 | SS | 12 | 25 | 50 | SS | 12 | 25 | 100 | SS | 12 | 25 |
| 0 | SS | 12 | 50 | 50 | SS | 12 | 50 | 100 | SS | 12 | 50 |
| 0 | SS | 12 | 75 | 50 | SS | 12 | 75 | 100 | SS | 12 | 75 |
| 0 | SS | 12 | 100 | 50 | SS | 12 | 100 | 100 | SS | 12 | 100 |
| 0 | SS | 25 | 0 | 50 | SS | 25 | 0 | 100 | SS | 25 | 0 |
| 0 | SS | 25 | 25 | 50 | SS | 25 | 25 | 100 | SS | 25 | 25 |

TABLE 4-continued

Monte-Carlo modeling-90 cases of realistic 6" borehole

| Yo (%) | Lith | φ (%) | So (%) | Yo (%) | Lith | φ (%) | So (%) | Yo (%) | Lith | φ (%) | So (%) |
|---|---|---|---|---|---|---|---|---|---|---|---|
| | | Formation | 30 | | | | 30 | | | | 30 |
| 0 | SS | 25 | 50 | 50 | SS | 25 | 50 | 100 | SS | 25 | 50 |
| 0 | SS | 25 | 75 | 50 | SS | 25 | 75 | 100 | SS | 25 | 75 |
| 0 | SS | 25 | 100 | 50 | SS | 25 | 100 | 100 | SS | 25 | 100 |
| 0 | SS | 35 | 0 | 50 | SS | 35 | 0 | 100 | SS | 35 | 0 |
| 0 | SS | 35 | 25 | 50 | SS | 35 | 25 | 100 | SS | 35 | 25 |
| 0 | SS | 35 | 50 | 50 | SS | 35 | 50 | 100 | SS | 35 | 50 |
| 0 | SS | 35 | 75 | 50 | SS | 35 | 75 | 100 | SS | 35 | 75 |
| 0 | SS | 35 | 100 | 50 | SS | 35 | 100 | 100 | SS | 35 | 100 |
| 0 | LS | 12 | 0 | 50 | LS | 12 | 0 | 100 | LS | 12 | 0 |
| 0 | LS | 12 | 25 | 50 | LS | 12 | 25 | 100 | LS | 12 | 25 |
| 0 | LS | 12 | 50 | 50 | LS | 12 | 50 | 100 | LS | 12 | 50 |
| 0 | LS | 12 | 75 | 50 | LS | 12 | 75 | 100 | LS | 12 | 75 |
| 0 | LS | 12 | 100 | 50 | LS | 12 | 100 | 100 | LS | 12 | 100 |
| 0 | LS | 25 | 0 | 50 | LS | 25 | 0 | 100 | LS | 25 | 0 |
| 0 | LS | 25 | 25 | 50 | LS | 25 | 25 | 100 | LS | 25 | 25 |
| 0 | LS | 25 | 50 | 50 | LS | 25 | 50 | 100 | LS | 25 | 50 |
| 0 | LS | 25 | 75 | 50 | LS | 25 | 75 | 100 | LS | 25 | 75 |
| 0 | LS | 25 | 100 | 50 | LS | 25 | 100 | 100 | LS | 25 | 100 |
| 0 | LS | 35 | 0 | 50 | LS | 35 | 0 | 100 | LS | 35 | 0 |
| 0 | LS | 35 | 25 | 50 | LS | 35 | 25 | 100 | LS | 35 | 25 |
| 0 | LS | 35 | 50 | 50 | LS | 35 | 50 | 100 | LS | 35 | 50 |
| 0 | LS | 35 | 75 | 50 | LS | 35 | 75 | 100 | LS | 35 | 75 |
| 0 | LS | 35 | 100 | 50 | LS | 35 | 100 | 100 | LS | 35 | 100 |

On the other hand, in the real case, the tool is decentered in a 6" hole, i.e., the tool is against the borehole wall, while the borehole is filled with water ($Y_o=0$), oil ($Y_o=10000\%$), and a 50/50 mixture of oil and water ($Y_o=500\%$). Two rock lithologies, sandstone (SS) and limestone (LS), were investigated. Three porosities, low (12%) a intermediate (25%) and high (35%) were also used. Finally, the Monte-Carlo simulations were performed with 5 saturations: $S_o=0$, i.e., the reference waterline, $S_o=25\%$, a generic residual oil saturation, $S_o=50\%$, a remaining oil saturation during the process of waterflooding, $S_o=75\%$ i.e., a symbolic irreducible water saturation of 25%, and $S_o=100\%$, the reference oil line.

Other parameters used in the Monte-Carlo N-Particle modeling studies are listed in Table 5.

TABLE 5 parameters used in Monte-Carlo N-Particle modeling studies

| Parameters | Values |
|---|---|
| Sandstone (SS) | $SiO_2$, with density of 2.65 g/cc |
| Limestone (LS) | $CaCO_3$, with density of 2.71 g/cc |
| Oil | 0.85 g/cc with R = H/C = 2 |
| Water | 75 kppm NaCl brine |
| Temperature | 200 F. |
| Pressure | 3000 psi |

Figure 7:
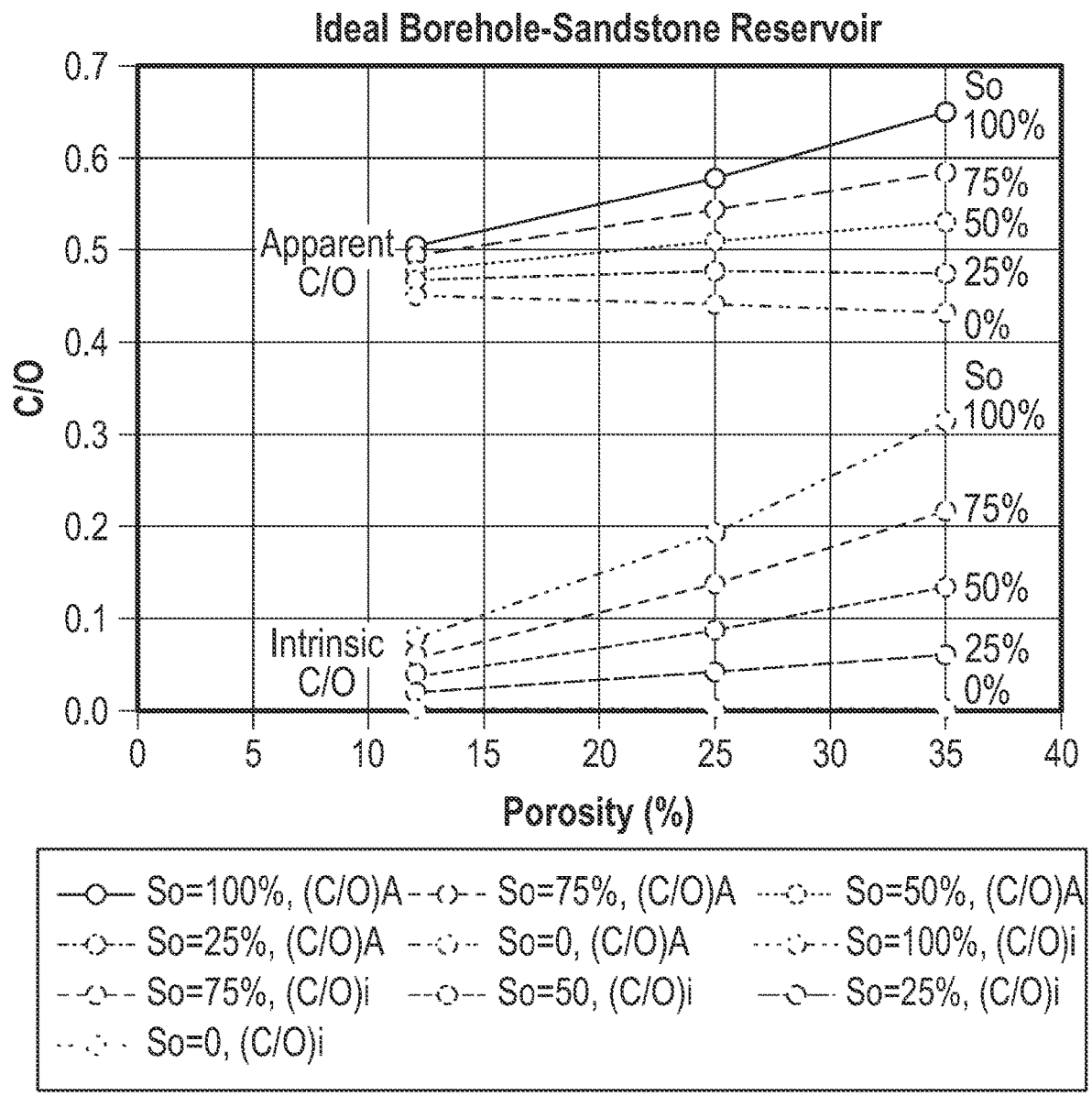
FIG. 7 illustrates a Monte-Carlo modeling results of intrinsic and apparent C/O as a function of porosity and oil saturation with an ideal 2.125" borehole penetrated sandstone reservoirs, in accordance with examples of the present disclosure.
Figure 8:
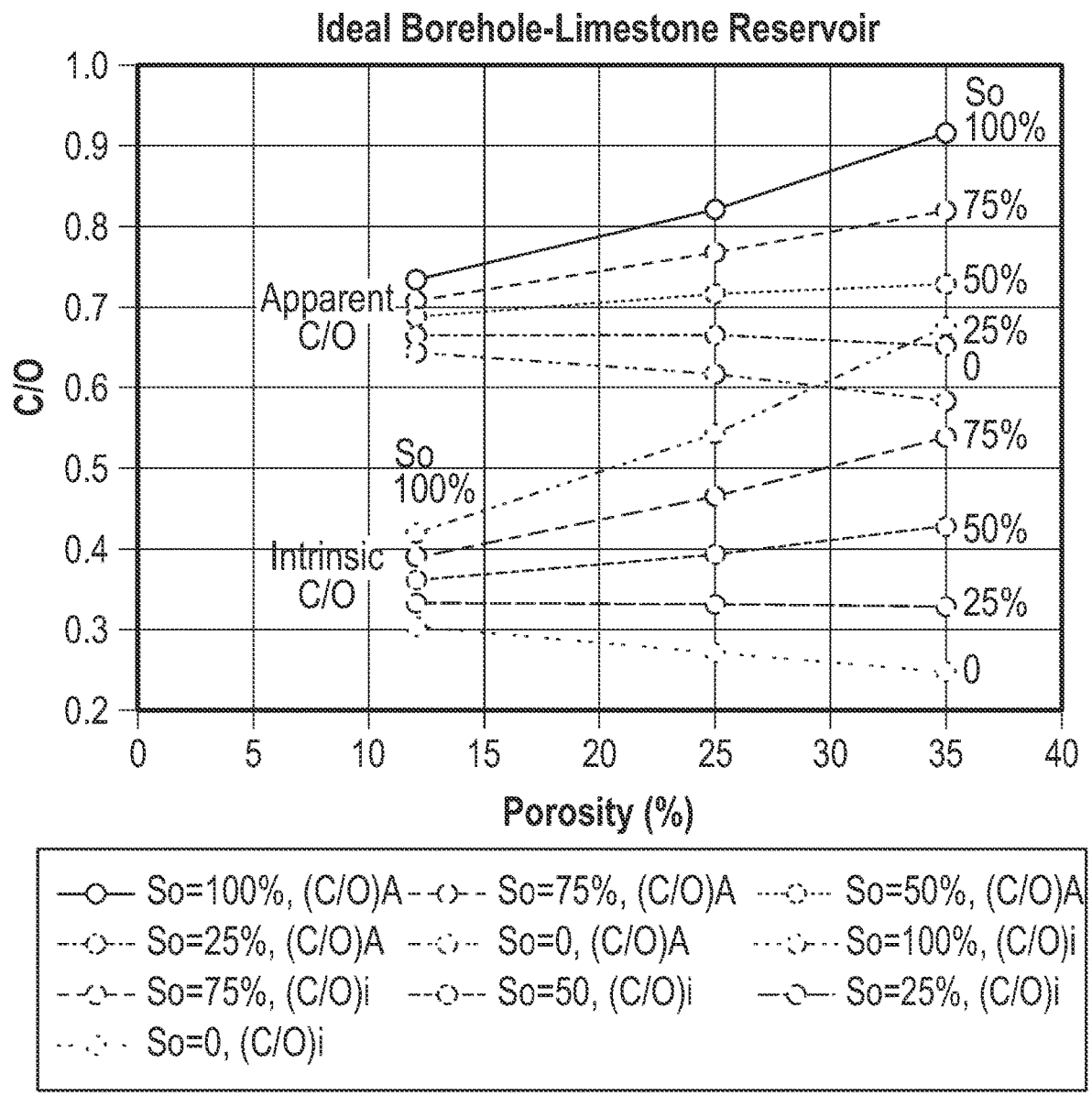
FIG. 8 illustrates a Monte-Carlo modeling results of intrinsic and apparent C/O as a function of porosity and oil saturation with an ideal 2.125" borehole penetrated limestone reservoirs, in accordance with examples of the present disclosure.
Figure 9:
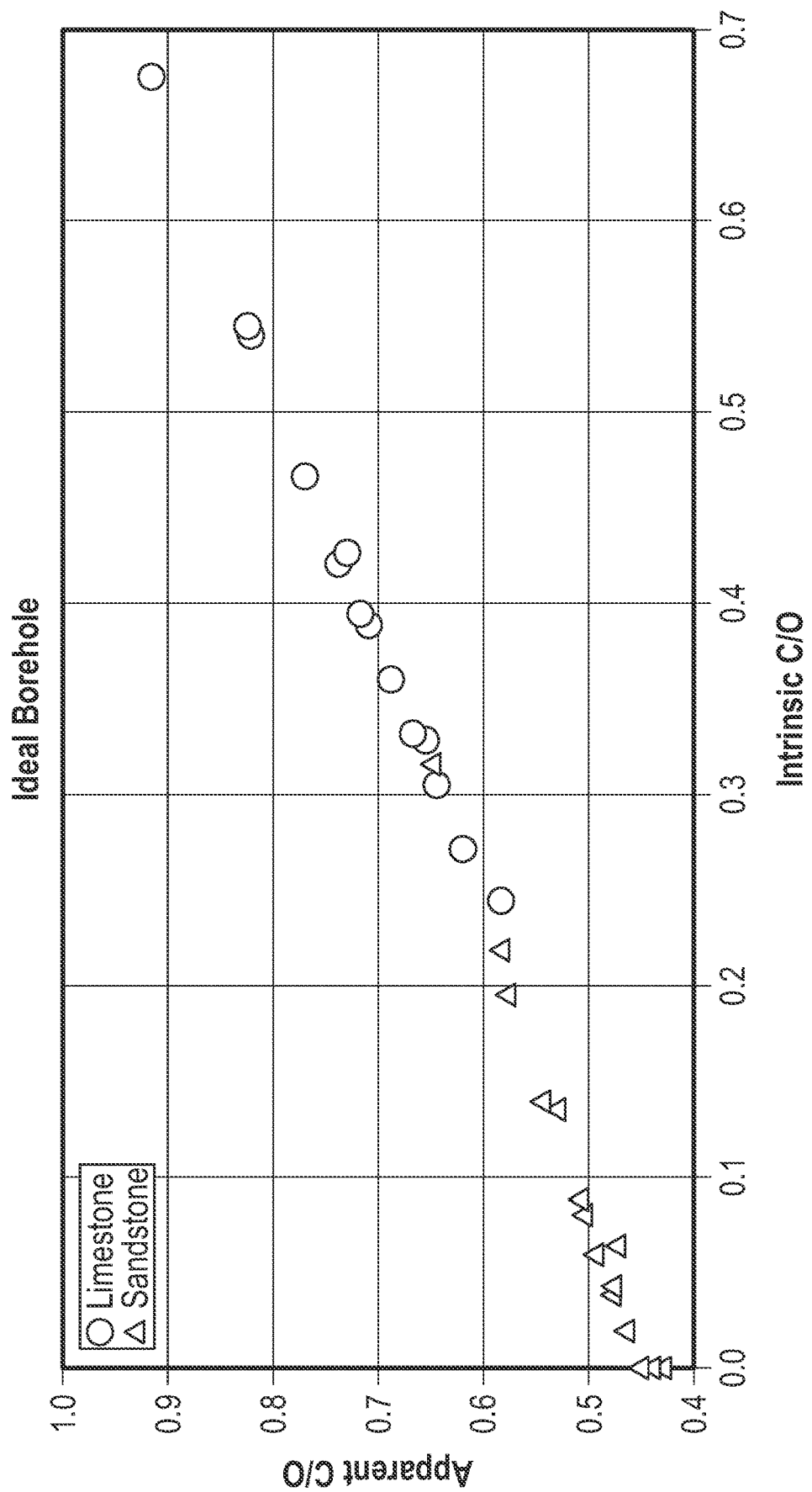
FIG. 9 illustrates an intrinsic vs. apparent C/O for all porosities, oil saturations, and lithology with an ideal borehole, in accordance with examples of the present disclosure.

The Monte-Carlo simulation results for the 30 cases of ideal 2.125" borehole (Table 3) are plotted in FIG. 7 for sandstone and FIG. 8 for limestone. Intrinsic and apparent C/O for all porosities, oil saturations, and lithology is cross plot in FIG. 9. By analyzing data of FIG. 9, the following intrinsic and apparent transformation is obtained, to calculate Tool M apparent C/O if intrinsic C/O is known:

$(C/O)_A = a(C/O)_i + b(1-\emptyset)(1-c_{Vs}) + d$  Equation (7)

or to calculate tool independent intrinsic C/O from Tool M measured apparent C/O:

$(C/O)_i = (1/a)[(C/O)_A - b(1-\emptyset)(1-c_{Vs}) - d]$  Equation (8)

where constants a, b, and d are functions of C/O logging tools such as tool size, pulsing mode, detector type and spacing, c is related to formation lithology.

Specifically, a is a sensitivity factor, the larger the better, b is the bulk density correction to the gamma attenuation, c is a parameter for correcting the slight difference of the limestone matrix bulk density with respect to that of sandstone matrix at the same porosity, and d is an estimate of the down scattering of oxygen gammas into the C window, when the windows method is used for the spectral data processing.

By examining Equation (7) and Equation (8), the relationship between the tool dependent apparent C/O and system intrinsic C/O is essentially linear, with an additional term b to correct the slight difference in bulk density between limestone and sandstone matrix at the same porosity. Therefore, if constants a, b, c, and d are known, the measured apparent C/O enables a reliable calculation of the intrinsic C/O, (C/O)i, and transform the C/O logging tool M outputs into a consistent reservoir saturation monitoring technology.

Similar Monte-Carlo simulations were performed for the 90 cases where Tool M is decentered in a 6" borehole which has different oil/water holdups (Table 4). The intrinsic to apparent C/O transform constants (Equation 8) depend on oil holdups and are obtained and summarized in Table 6.

TABLE 6 intrinisic and apparent C/O transform constants.

| Borehole | | Transform Constants | | | |
|---|---|---|---|---|---|
| Size | Fluid | a | b | c | d |
| Ideal 2.125" | — | 0.74 | 0.08 | 0.35 | 0.38 |
| Realistic 6" | Water | 0.56 | 0.06 | 0.35 | 0.375 |
| | 50/50 W/O | 0.67 | 0.07 | 0.05 | 0.452 |
| | Oil | 0.84 | 0.08 | -0.2 | 0.543 |

Figure 10:
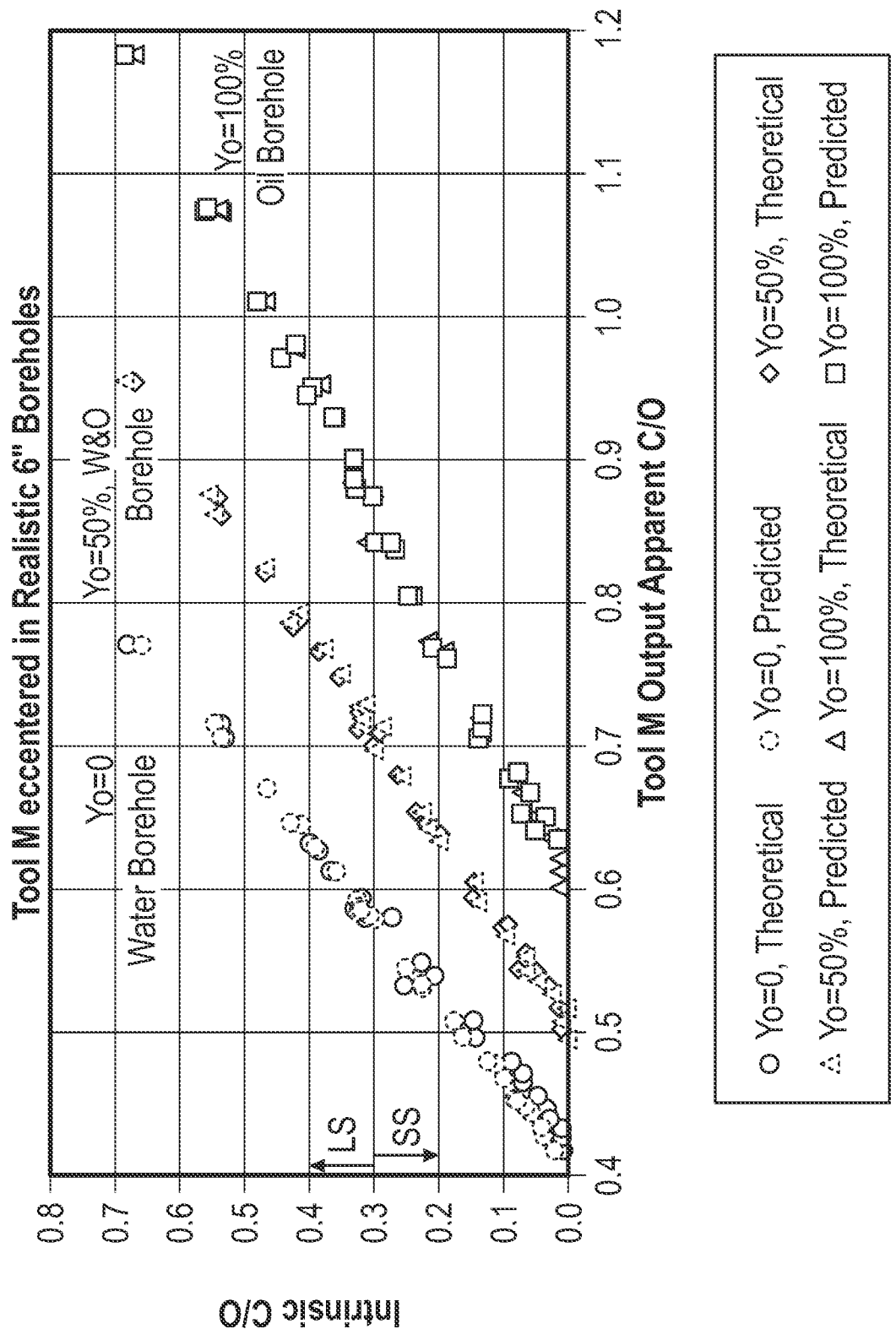
FIG. 10 illustrates an intrinsic vs. apparent C/O for all porosities, oil saturations, lithology, with Tool M decentered in realistic 6" borehole and different oil holdups, in accordance with examples of the present disclosure.
Figure 11:
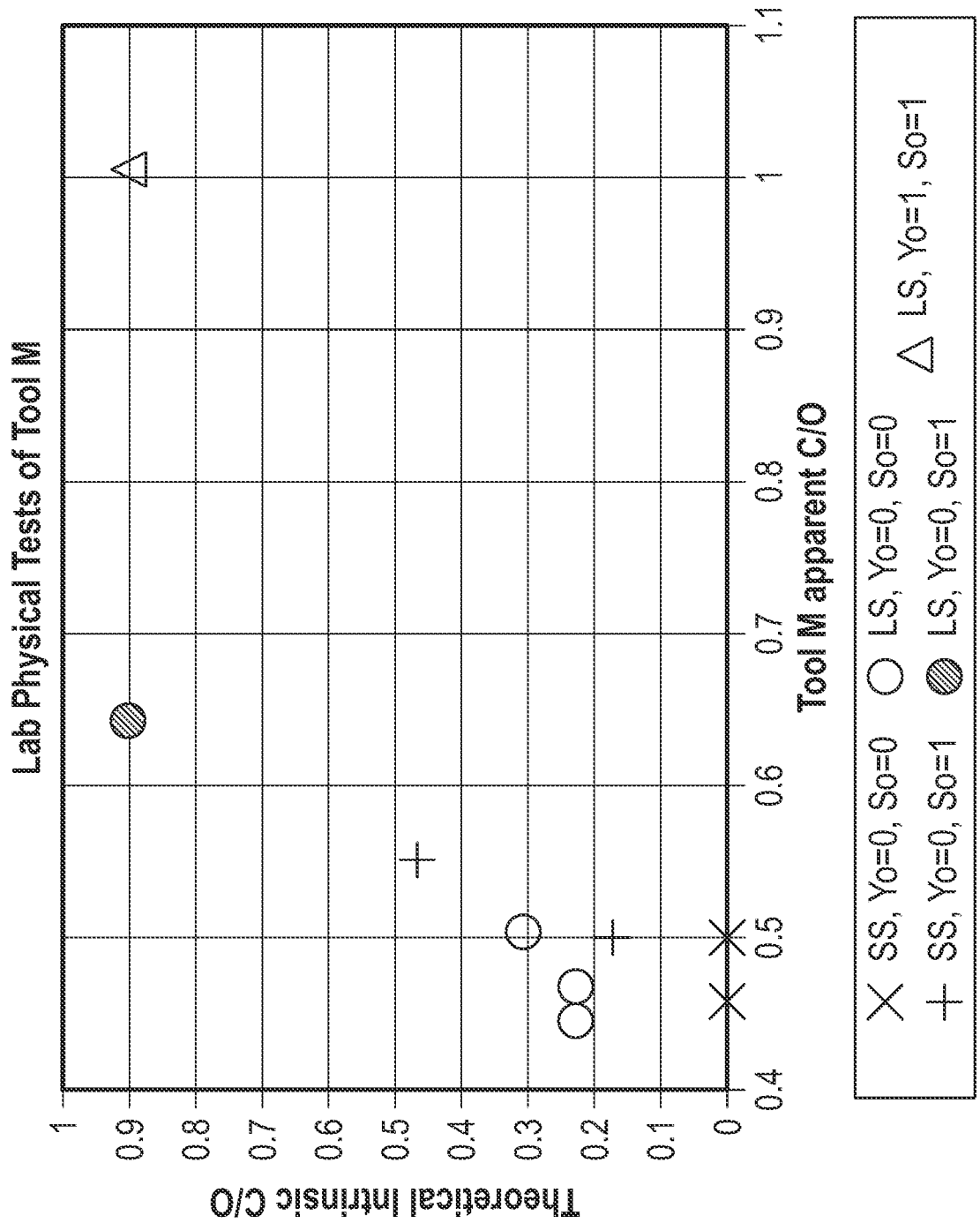
FIG. 11 illustrates Tool M apparent C/O vs. system intrinsic C/O for the 11 lab tests of Table 7, in accordance with examples of the present disclosure.

For each borehole oil holdup $Y_o$, modeled apparent C/O from Tool M at conditions of different lithology, porosity, and oil saturation correlate very well with system intrinsic C/O, as shown in FIG. 10. Different correlations were obtained for different borehole oil holdups. From FIG. 10, it is noted that measured apparent C/O can be converted to system intrinsic C/O if borehole oil holdup is characterized, separately.

To verify the observations from Monte-Carlo modeling studies, 11 laboratory C/O logging experiments were conducted (shown in Table 7), covering the following conditions: 6" and 8" boreholes (column 1), water ($Y_o=0$) and oil filled ($Y_o=1$) boreholes (column 2), limestone and sandstone matrices (column 3), low (13%) and high (40%) porosities (column 4), water ($S_o=0$), and oil saturated ($S_o=1$) matrices (column 5).

TABLE 7

Laboratory C/O tool testing-11 experiments.

| Borehole | | Formation | | | C/O | | |
|---|---|---|---|---|---|---|---|
| Size | Fluid | Lith | φ (%) | So | $(C/O)_i$ | $(C/O)_A$ | $(C/O)_{ic}$ |
| 6" | W | LS | 13 | 0 | 0.302 | 0.501 | 0.31 |
| 6" | W | LS | 43 | 0 | 0.219 | 0.463 | 0.208 |
| 6" | W | LS | 43 | 1 | 0.895 | 0.641 | 0.921 |

TABLE 7-continued

Laboratory C/O tool testing-11 experiments.

| Borehole | | Formation | | | | | |
|---|---|---|---|---|---|---|---|
| Size | Fluid | Lith | φ (%) | So | $(C/O)_i$ | $(C/O)_A$ | $(C/O)_{ic}$ |
| 8" | W | LS | 43 | 0 | 0.219 | 0.445 | 0.199 |
| 8" | O | LS | 43 | 1 | 0.895 | 1.004 | 0.918 |
| 6" | W | SS | 0 | 0 | 0 | 0.501 | 0.008 |
| 6" | W | SS | 20 | 0 | 0 | 0.46 | 0.008 |
| 6" | W | SS | 40 | 0 | 0 | 0.46 | 0.003 |
| 6" | W | SS | 0 | 1 | 0 | 0.46 | 0.008 |
| 6" | W | SS | 20 | 1 | 0.166 | 0.5 | 0.142 |
| 6" | W | SS | 40 | 1 | 0.442 | 0.55 | 0.42 |

Figure 12:
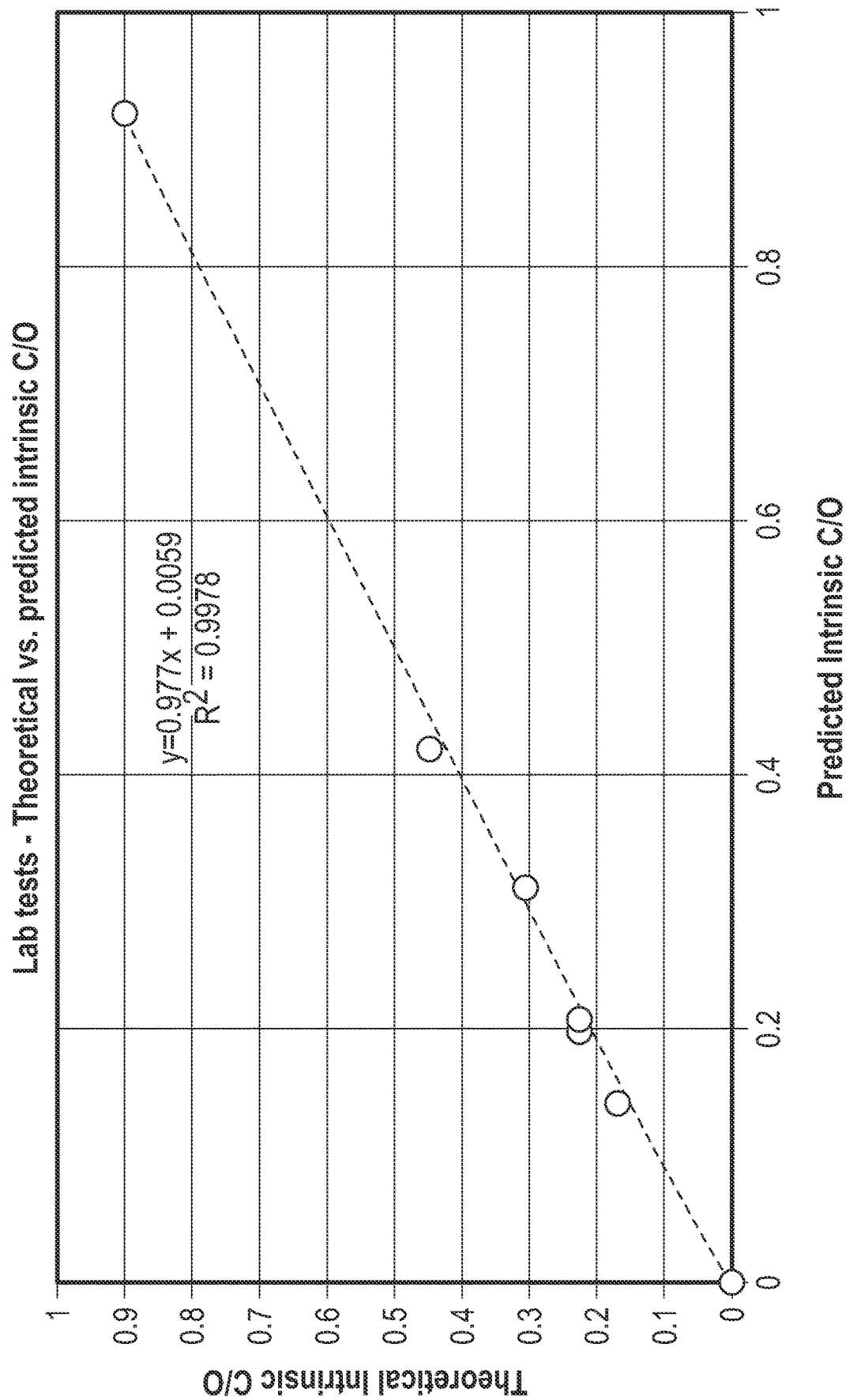
FIG. 12 illustrates the test of performance of Tool M apparent C/O vs. system intrinsic C/O transformation using Equation (8) for the 11 lab tests of Table 7, in accordance with examples of the present disclosure.

Results of the laboratory experiments are also summarized in Table 7, including system intrinsic C/O (column 6), tool measured apparent C/O (column 7), and predicted intrinsic C/O from the measured apparent C/O (column 8). The results of Table 7 are plotted in FIG. 12. From this figure, it is notes that there is no simple one-to-one relationship between the tool output apparent C/O, $(C/O)_A$, and the system theoretical intrinsic C/O, $(C/O)_i$. However, when the apparent to intrinsic C/O transformation is applied using the constant values determined by modeling for the applicable borehole environment, intrinsic C/O can be obtained with high accuracy as illustrated in the correlation between the theoretical and predicted intrinsic C/O in FIG. 12.

Pulsed-neutron carbon-oxygen (C/O) ratio is still the most popular technology for reservoir monitoring because it is insensitive to formation water salinity. This disclosure demonstrates that tool dependent apparent C/O can be converted to reservoir specific intrinsic C/O, using a transforming model.

Accordingly, the techniques as described herein result in a single set of intrinsic CO measurements that can be used for various borehole and formation saturation conditions, enhancing the reliability and robustness of formation evaluation in oil and gas wells. The systems and methods may include any of the various features disclosed herein, including one or more of the following statements.

Statement 1. A method comprising: determining an intrinsic carbon-oxygen (CO) ratio for a subterranean formation, based on atomic concentrations of carbon and oxygen, and porosity and fluid saturation parameters; and characterizing the subterranean formation based on the intrinsic CO ratio.

Statement 2. The method of statement 1, further comprising acquiring data of the subterranean formation with a logging tool.

Statement 3. The method of statement 1 or statement 2, wherein the logging tool includes a neutron logging tool.

Statement 4. The method of any one of statements 1-3, further comprising determining a CO with the neutron logging tool.

Statement 5. The method of any one of statements 1-4, further comprising comparing a determined CO ratio with the intrinsic CO ratio.

Statement 6. The method of any one of statements 1-5, wherein the intrinsic CO is a polar coordinate of porosity and oil saturation, where a radius is the porosity and an angle is the oil saturation.

Statement 7. The method of any one of statements 1-6, wherein the intrinsic CO ratio is a function of formation matrix, formation porosity, oil saturation, and borehole holdup.

Statement 8. The method of any one of statements 1-7, wherein the intrinsic CO ratio is based on a theoretical atomic concentration of carbon in a formation and a formation fluid; a theoretical atomic concentration of carbon in borehole fluid; a theoretical atomic concentration of oxygen in the formation and formation fluid; and a theoretical atomic concentration of oxygen in borehole fluid.

Statement 9. The method of any one of statements 1-8, wherein an increase of the intrinsic CO ratio is spiral.

Statement 10. The method of any one of statements 1-9, further comprising logging the wellbore with a pulsed neutron logging tool for CO measurements.

Statement 11. The method of any one of statements 1-10, further comprising comparing the intrinsic CO ratio to measurements acquired with multiple logging tools.

Statement 12. The method of statement 11, wherein the multiple logging tools include neutron logging tools.

Statement 13. The method of statement 11 or the statement 12, further comprising increasing production from the wellbore due to the intrinsic CO ratio.

Statement 14. A system comprising: a logging tool; and a computer configured to: determine an intrinsic carbon-oxygen (CO) ratio for a subterranean formation, based on atomic concentrations of carbon and oxygen, and porosity and fluid saturation parameters; compare the intrinsic CO ratio to measurements acquired with the logging tool; and characterize a subterranean formation based on the intrinsic CO ratio.

Statement 15. The system of statement 14, wherein the intrinsic CO ratio is based on a theoretical atomic concentration of carbon in a formation and a formation fluid; a theoretical atomic concentration of carbon in borehole fluid; a theoretical atomic concentration of oxygen in the formation and formation fluid; and a theoretical atomic concentration of oxygen in borehole fluid.

Statement 16. The system of any one of statements 14 or 15, wherein the intrinsic CO ratio is a function of formation matrix, formation porosity, oil saturation, and borehole holdup.

Statement 17. The system of any one of statements 14-16, wherein the logging tool includes a pulsed neutron logging tool.

Statement 18. The system of any one of statements 14-17, wherein the intrinsic CO is a polar coordinate of porosity and oil saturation, where a radius is the porosity and an angle is the oil saturation.

Statement 19. The system of any one of statements 14-18, wherein an increase of the intrinsic CO ratio is spiral.

Statement 20. The system of any one of statements 14-19, wherein the atomic concentrations of carbon and oxygen are theoretical concentrations.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   determining an intrinsic carbon-oxygen (CO) ratio for a subterranean formation, wherein the intrinsic CO ratio is a function of a matrix of the subterranean formation, formation porosity, oil saturation, and borehole holdup, wherein an increase of the intrinsic CO ratio is spiral using polar coordinate of formation porosity and oil saturation, wherein a radius is the formation porosity and an angle is the oil saturation, based on:
     a theoretical atomic concentration of carbon in a subterranean formation and a subterranean formation fluid; a theoretical atomic concentration of carbon in borehole fluid, a theoretical atomic concentration of oxygen in the subterranean formation and subterranean formation fluid; and a theoretical atomic concentration of oxygen in borehole fluid;
   the formation porosity obtained from log analysis or approximated from the type of subterranean formation;
   and fluid saturation parameters obtained from fan charts, logging tool, or any combination thereof; and
   characterizing the subterranean formation based on the intrinsic CO ratio.

2. The method of claim 1, further comprising acquiring data of the subterranean formation with a logging tool.

3. The method of claim 2, wherein the logging tool includes a neutron logging tool.

4. The method of claim 3, further comprising determining a CO ratio with the neutron logging tool.

5. The method of claim 4, further comprising comparing a determined CO ratio with the intrinsic CO ratio.

6. The method of claim 1, further comprising logging the wellbore with a pulsed neutron logging tool for CO measurements.

7. The method of claim 1, further comprising comparing the intrinsic CO ratio to measurements acquired with multiple logging tools.

8. The method of claim 7, wherein the multiple logging tools include neutron logging tools.

9. The method of claim 1, further comprising increasing production from a wellbore due to the intrinsic CO ratio.

10. A system comprising:
    a logging tool; and
    a computer configured to:
    determine an intrinsic carbon-oxygen (CO) ratio for a subterranean formation, wherein the intrinsic CO ratio is a function of a matrix of the subterranean formation, formation porosity, oil saturation, and borehole holdup, wherein an increase of the intrinsic CO ratio is spiral using polar coordinate of formation porosity and oil saturation, wherein a radius is the formation porosity and an angle is the oil saturation, based on atomic concentrations of carbon and oxygen, and formation porosity, and fluid saturation parameters;
    compare the intrinsic CO ratio to measurements acquired with the logging tool; and
    characterize the subterranean formation based on the intrinsic CO ratio.

11. The system of claim 10, wherein the intrinsic CO ratio is based on a theoretical atomic concentration of carbon in a subterranean formation and a subterranean formation fluid; a theoretical atomic concentration of carbon in borehole fluid; a theoretical atomic concentration of oxygen in the subterranean formation and subterranean formation fluid; and a theoretical atomic concentration of oxygen in borehole fluid.

12. The system of claim 10, wherein the intrinsic CO ratio is a function of formation matrix, formation porosity, oil saturation, and borehole holdup.

13. The system of claim 10, wherein the logging tool includes a pulsed neutron logging tool.

14. The system of claim 10, wherein the atomic concentrations of carbon and oxygen are theoretical concentrations.

* * * * *